United States Patent
Wang et al.

(10) Patent No.: US 11,678,328 B2
(45) Date of Patent: *Jun. 13, 2023

(54) METHOD OF MULTIPLEXING UPLINK CONTROL INFORMATION AND RELATED DEVICE

(71) Applicant: FG Innovation Company Limited, Tuen Mun (HK)

(72) Inventors: Hai-Han Wang, Taipei (TW); Wan-Chen Lin, Taipei (TW); Chia-Hung Wei, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,630

(22) Filed: Jun. 17, 2022

(65) Prior Publication Data

US 2022/0322340 A1 Oct. 6, 2022

Related U.S. Application Data

(63) Continuation of application No. 17/065,244, filed on Oct. 7, 2020, now Pat. No. 11,412,490.

(Continued)

(51) Int. Cl.
*H04W 72/04* (2009.01)
*H04W 72/21* (2023.01)
(Continued)

(52) U.S. Cl.
CPC .......... *H04W 72/21* (2023.01); *H04B 7/0626* (2013.01); *H04L 1/1819* (2013.01); *H04L 5/0055* (2013.01); *H04W 72/0446* (2013.01)

(58) Field of Classification Search
CPC ......... H04W 72/0413; H04W 72/1284; H04W 72/1242; H04W 72/0446; H04B 7/0626;
(Continued)

(56) References Cited

U.S. PATENT DOCUMENTS

2016/0192388 A1 6/2016 Ekpenyong et al.
2019/0182857 A1 6/2019 Shen et al.
(Continued)

FOREIGN PATENT DOCUMENTS

CN 108259154 A 7/2018
CN 110149726 A 8/2019
(Continued)

OTHER PUBLICATIONS

Qualcomm Incorporated, "Summary of remaining issues for overlapping UL transmissions", R1-1807820, 3GPP TSG RAN WG1 Meeting #93, May 25, 2018, the whole document.
(Continued)

*Primary Examiner* — Mahbubul Bar Chowdhury
(74) *Attorney, Agent, or Firm* — ScienBiziP, P.C.

(57) ABSTRACT

A method for a BS for processing multiplexed UCI received from a UE is disclosed. The method includes grouping PUCCH resources for CSI and an SR with a low priority and PUCCH resources for a slot-based HARQ-ACK into a first group of PUCCH resources; grouping PUCCH resources for CSI and an SR with a high priority and PUCCH resources for a sub-slot based HARQ-ACK into a second group of PUCCH resources; determining a first set of PUCCH resources in a slot from the first group; obtaining first multiplexed UCI of a first PUCCH resource by a first UCI multiplexing procedure for UCI corresponding to the first set; determining a second set of PUCCH resources in a sub-slot of the slot from the second group; and obtaining second multiplexed UCI of a second PUCCH resource by a second UCI multiplexing procedure for UCI corresponding to the second set.

12 Claims, 9 Drawing Sheets

Related U.S. Application Data

(60) Provisional application No. 62/911,529, filed on Oct. 7, 2019.

(51) Int. Cl.
  *H04W 72/0446*  (2023.01)
  *H04L 5/00*  (2006.01)
  *H04B 7/06*  (2006.01)
  *H04L 1/1812*  (2023.01)

(58) Field of Classification Search
  CPC ... H04L 1/1819; H04L 1/0026; H04L 1/1671; H04L 1/1861; H04L 5/0055; H04L 5/0057
  See application file for complete search history.

(56) References Cited

U.S. PATENT DOCUMENTS

| | | | | |
|---|---|---|---|---|
| 2019/0306922 | A1* | 10/2019 | Xiong | H04L 1/1664 |
| 2020/0228248 | A1* | 7/2020 | Islam | H04L 1/1861 |
| 2020/0343959 | A1 | 10/2020 | Wu et al. | |

FOREIGN PATENT DOCUMENTS

| | | | | |
|---|---|---|---|---|
| WO | 2016163855 | A1 | 10/2016 | |
| WO | 2018/106063 | A1 | 6/2018 | |
| WO | 2019172624 | A1 | 9/2019 | |
| WO | 2021/052113 | A1 | 3/2021 | |
| WO | WO-2021052113 | A1 * | 3/2021 | ........... H04L 1/1854 |

OTHER PUBLICATIONS

Notice of Allowance dated Mar. 17, 2022 for U.S. Appl. No. 17/065,244 which is the parent application of the instant application.

3GPP TS 38.213, "3rd Generation Partnership Project; Technical Specification Group Radio Access Network; NR Physical layer procedures for control (Release 15)", V15.5.0 (Mar. 2019).

3GPP TS 38.331, "3rd Generation Partnership Project; Technical Specification Group Radio Access Network; NR Radio Resource Control (RRC) protocol specification (Release 15)", V15.5.0 (Mar. 2019).

3GPP TS 38.214, "3rd Generation Partnership Project; Technical Specification Group Radio Access Network; NR Physical layer procedures for data (Release 15)", V15.5.0 (Mar. 2019).

3GPP TS 38.211, "3rd Generation Partnership Project; Technical Specification Group Radio Access Network; NR Physical channels and modulation (Release 15)", V15.7.0 (Sep. 2019).

* cited by examiner

METHOD OF MULTIPLEXING UPLINK CONTROL INFORMATION AND RELATED DEVICE

CROSS-REFERENCE TO RELATED APPLICATION(S)

This application is a continuation application of U.S. patent application Ser. No. 17/065,244, filed on Oct. 7, 2020, which claims the benefit of and priority to U.S. Provisional Patent Application Ser. No. 62/911,529, filed on Oct. 7, 2019. The contents of all of the above-mentioned applications are hereby fully incorporated by reference into the present disclosure.

FIELD

The present disclosure generally relates to wireless communications and, more particularly, to a method of processing multiplexed uplink control information (UCI) and a related device.

BACKGROUND

With the tremendous growth in the number of connected devices and the rapid increase in user/network traffic volume, various efforts have been made to improve different aspects of wireless communication for next-generation wireless communication systems, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for next-generation wireless communication systems.

SUMMARY

The present disclosure provides a method of processing multiplexed uplink control information (UCI) and a related device.

According to an aspect of the present disclosure, a method for a base station (BS) for processing multiplexed uplink control information (UCI) received from a user equipment (UE) is provided. The method includes grouping PUCCH resources for Channel State Information (CSI) and a Scheduling Request (SR) with a low priority and PUCCH resources for a slot based hybrid automatic repeat request acknowledgement (HARQ-ACK) into a first group of PUCCH resources, grouping PUCCH resources for CSI and an SR with a high priority and PUCCH resources for a sub-slot based HARQ-ACK into a second group of PUCCH resources, determining a first set of PUCCH resources in a slot from the first group of PUCCH resources, obtaining first multiplexed UCI of a first PUCCH resource by performing a first UCI multiplexing procedure for UCI corresponding to the first set of PUCCH resources in the slot, determining a second set of PUCCH resources in a sub-slot of the slot from the second group of PUCCH resources, and obtaining second multiplexed UCI of a second PUCCH resource by performing a second UCI multiplexing procedure for UCI corresponding to the second set of PUCCH resources in the sub-slot of the slot.

According to another aspect of the present disclosure, a BS for processing multiplexed UCI is provided. The BS includes at least one processor, and at least one memory coupled to the at least one processor, the at least one memory storing computer-executable instructions that, when executed by the at least one processor, cause the BS to perform the above-disclosed method of processing multiplexed UCI.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DESCRIPTION

Figure 1:
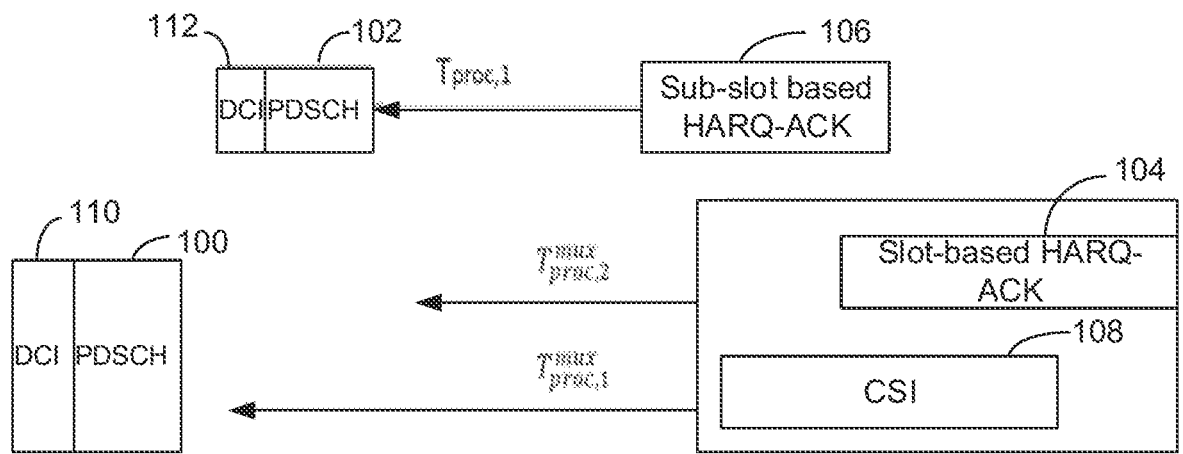
FIGS. 1 and 2 are diagrams illustrating timing requirements for a physical downlink shared channel (PDSCH) in a slot-based HARQ-ACK PUCCH and a sub-slot based HARQ-ACK PUCCH, according to an implementation of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, an LTE-Advanced Pro system, or an NR system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the downlink (DL) and optionally uplink (UL) resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided via an NR frame to support ProSe services or V2X services.

In NR, multiple types of UCI may be used by a gNB to make scheduling decisions, some of which are dynamically scheduled (e.g., hybrid automatic repeat request acknowledgement (HARQ-ACK)), and some of which are semi-statically configured (e.g., periodic channel state information (P-CSI)). It is hard for a gNB to always schedule UCI in a slot in which no other UCI is configured due to latency requirements, resource availability, etc. Therefore, a rule for multiplexing and dropping UCI when multiple physical uplink control channels (PUCCHs) are overlapped in time has been specified in Rel-15 NR, so that a single PUCCH or physical uplink shared channel (PUSCH) is transmitted at a time.

In NR, different PUCCHs may be configured with different starting symbols in a slot. Similarly, PUSCHs can also be scheduled with different starting symbols in the slot. The multiplexing procedure performs the following steps iteratively. Firstly, a first PUCCH with the earliest starting symbol and longest duration in the slot is determined, and a first group of PUCCHs overlapping with the first PUCCH is determined. Secondly, a second PUCCH (may be the same as or different from the first PUCCH) carrying the multiplexed UCIs of the first PUCCH and the group of overlapping PUCCHs is determined from the first PUCCH and the group of overlapping PUCCHs. Thirdly, the multiplexing procedure then proceeds to determine from the remaining PUCCH resources in the slot a second group of PUCCHs overlapping the second PUCCH, if any, and determine a third PUCCH (which may be the same as or different from the second PUCCH) carrying the multiplexed UCIs from the second PUCCH and the second group of overlapping PUCCHs. The multiplexing procedure is performed iteratively until at most two non-overlapping PUCCHs are determined. After the multiplexed UCIs and the PUCCH carrying the multiplexed UCIs are determined, the UE multiplexes the multiplexed UCIs on a PUSCH if the PUCCH carrying the multiplexed UCIs overlaps the PUSCH in the time domain.

In addition, the scheduling made by the gNB should guarantee that the overlapping PUCCH and PUSCH satisfy specific timeline requirements. The timeline requirements are applied to ensure the time duration from the ending time of a scheduling downlink control information (DCI) and a PDSCH to the starting time of the overlapping group of PUCCHs is long enough for a UE to process the received DCI and the PDSCH, and to prepare the UCI for the multiplexing procedure.

Moreover, in Rel-16 NR, it is agreed to introduce a sub-slot based HARQ-ACK PUCCH for carrying HARQ-ACK information. The sub-slot HARQ-ACK PUCCH may be used to carry the HARQ-ACK codebook for a high priority traffic. One slot may consist of 14 symbols. The sub-slot configuration may consist of 7 symbols (a.k.a., there are two sub-slots contained in a slot) or consist of 2 symbols (a.k.a., there are seven sub-slots contained in a slot). Each sub-slot may apply the same PUCCH resource configuration. The PUCCH resource configuration may be carried in PUCCH-Config in a radio resource control (RRC) configuration message transmitted by an gNB when an RRC connection is established between the UE and the gNB. Configuration of the starting symbol of a sub-slot HARQ-ACK PUCCH may be relative to the first symbol of the sub-slot in which the sub-slot HARQ-ACK PUCCH transmission starts. The sub-slot in which a sub-slot HARQ-ACK PUCCH transmission starts may be indicated by DCI scheduling a PDSCH corresponding to the PUCCH or may be configured in a RRC configuration of a semi-persistent scheduling (SPS) PDSCH corresponding to the PUCCH. Configuration of the length of a sub-slot HARQ-ACK PUCCH may result in a last symbol of the sub-slot HARQ-ACK PUCCH located in the same sub-slot or different sub-slot than the sub-slot in which the sub-slot HARQ-ACK PUCCH transmission starts. It is allowable to transmit one or more HARQ-ACK PUCCHs in a slot in Rel-16 NR, one or more than one for the HARQ-ACK codebook with a high priority, and one for the HARQ-ACK codebook with a low priority. As a result, it is unclear how the UCI multiplexing procedure is performed. There are two issues that should be considered.

Issue 1

With the introduction of sub-slot based HARQ-ACK PUCCH, a UCI multiplexing procedure may involve both slot-based HARQ-ACK PUCCH and sub-slot based HARQ-ACK PUCCH. Since directly applying one UCI multiplexing procedure, as in Rel-15, on slot based HARQ-ACK PUCCHs, sub-slot based HARQ-ACK PUCCHs, and PUCCHs carrying other types of UCIs in a slot may cause some scheduling restriction, separate UCI multiplexing procedures on slot-based HARQ-ACK PUCCHs and sub-slot based HARQ-ACK PUCCHs should be considered. If the UCI multiplexing procedure is applied separately on slot based HARQ-ACK PUCCHs and sub-slot based HARQ-ACK PUCCHs in a slot, the order of performing the UCI multiplexing procedure is undefined Accordingly, it also needs to be disclosed in which multiplexing procedure would the PUCCHs carrying other types of UCI be multiplexed.

Issue 2

Since a sub-slot HARQ-ACK is used for URLLC traffic, the timeline requirements for a group of overlapping PUCCHs may restrict the scheduling flexibility and increase the latency. Therefore, the timeline requirements should be relaxed. The impact on the UCI multiplexing procedure due to the relaxation of timeline requirements should also be specified.

On the other hand, the sub-slot based HARQ-ACK PUCCH and the slot based HARQ-ACK PUCCH may correspond to different processing capabilities. Therefore, UCI multiplexing procedure may be affected. In addition, out-of-order HARQ-ACK PUCCH transmission may likely happen. That is, the PDSCH with a high priority arrives after the PDSCH with a low priority, but the corresponding HARQ-ACK PUCCH is in a reverse order. As a result, a processing for the PDSCH with a low priority may be affected, and a timeline of the UCI multiplexing procedure for the overlapping group with HARQ-ACK PUCCH for low-priority traffic is also affected.

To make the UCI multiplexing procedure more efficient with less PUCCH dropping, it is beneficial to group PUCCHs with slot based HARQ-ACK PUCCH and sub-slot based HARQ-ACK PUCCH, and thus the UCI multiplexing procedure may be performed separately for PUCCHs grouped with sub-slot based HARQ-ACK PUCCH and PUCCHs grouped with slot based HARQ-ACK PUCCH.

Principles for Grouping UCI

In one implementation, a grouping is based on a duration of a PUCCH for UCI. If the duration of the PUCCH is longer than a sub-slot time unit, the PUCCH is grouped with the slot based HARQ-ACK PUCCH. If the duration of the PUCCH is equal or shorter than a sub-slot time unit, the PUCCH is grouped with the sub-slot based HARQ-ACK PUCCH. If the duration of the PUCCH is longer than a threshold (e.g., a time unit configured by a network (NW)), the PUCCH is grouped with the slot based HARQ-ACK PUCCH. If the duration of the PUCCH is equal or shorter than a threshold (e.g., a time unit configured by a NW), the PUCCH is grouped with the sub-slot based HARQ-ACK PUCCH.

In one implementation, a grouping mechanism is based on the duration of the PUCCH for UCI. If the duration of the PUCCH is longer than a sub-slot time unit, the PUCCH is grouped with the slot based HARQ-ACK PUCCH. If the duration of the PUCCH is equal or shorter than a sub-slot time unit, the PUCCH is grouped with both the slot based HARQ-ACK PUCCH and sub-slot based HARQ-ACK PUCCH. If the duration of the PUCCH is longer than a threshold (e.g., a time unit configured by a NW), the PUCCH is grouped with the slot based HARQ-ACK PUCCH. If the duration of the PUCCH is equal or shorter than a threshold (e.g., a time unit configured by a network (NW)), the PUCCH is grouped with both the slot based HARQ-ACK PUCCH and sub-slot based HARQ-ACK PUCCH.

In one implementation, a grouping mechanism is based on a priority of the UCI. If a priority of the UCI is higher than a threshold, the UCI is grouped with the sub-slot based HARQ-ACK PUCCH. If a priority of the UCI is equal or lower than a threshold, the UCI is grouped with the slot based HARQ-ACK PUCCH. The threshold may be a fixed value (e.g., 0). The priority of the UCI may be but not limited to, being configured by an information element (IE) included in a DL radio resource control (RRC) message received from a gNB. The priority may be indicated by a value. For example, a small value is represented as a low priority.

In one implementation, a grouping mechanism is based on a priority of the UCI. If a priority of the UCI is higher than a threshold, the UCI is grouped with the sub-slot based HARQ-ACK PUCCH. If a priority of the UCI is equal or lower than a threshold, the UCI is grouped with the slot-based HARQ-ACK PUCCH.

In one implementation, a grouping mechanism is based on a PUCCH format for the UCI. For example, if a resource includes a short PUCCH format for the UCI (e.g. PUCCH format 0 or PUCCH format 2), the UCI is grouped with the sub-slot based HARQ-ACK PUCCH. If a resource includes a long PUCCH format for the UCI (e.g. PUCCH format 1, PUCCH format 3, or PUCCH format 4), the UCI is grouped with the slot based HARQ-ACK PUCCH, or grouped with the sub-slot based HARQ-ACK PUCCH and slot-based HARQ-ACK PUCCH.

In one implementation, a grouping mechanism is based on whether a PUCCH resource is configured with a sub-slot configuration. A UE may be configured with multiple sub-slot configurations for a serving cell or a UL bandwidth part (BWP). One sub-slot configuration may, but is not limited to, indicate the number of symbols included in each sub-slot. A sub-slot configuration may be associated with a PUCCH resource configuration. For example, a PUCCH-Config is configured with a sub-slot configuration, which applies to all PUCCH resources configured in the PUCCH-Config. The UCI that is an indication to apply a PUCCH resource configuration may be an implicit indication to apply the sub-slot configuration associated with the PUCCH resource. For example, if the sub-slot configuration is configured to the PUCCH resource, the PUCCH resource is grouped with the sub-slot based HARQ-ACK PUCCH. If the sub-slot configuration is not configured to the PUCCH resource, the PUCCH resource is grouped with the slot based HARQ-ACK PUCCH, or grouped with the slot based and sub-slot based HARQ-ACK PUCCH.

In one example of this implementation, it is noted that the sub-slot configuration may refer to a specific sub-slot configuration (e.g., seven 2-symbol sub-slots in a slot or two 7-symbol sub-slots in a slot). It is noted that the specific configuration may correspond to a configured index.

In one example of this implementation, only the PUCCH for UCI applied with the same sub-slot configuration may be grouped.

In one implementation, a grouping mechanism is based on a type of UCI. For example, a specific type of the UCI (e.g., Scheduling Request (SR)) may be grouped with the sub-slot based HARQ-ACK PUCCH. Another specific type of the UCI (e.g., CSI) may be grouped with the slot based HARQ-ACK PUCCH. The specific type of the UCI may be configured with a priority. The UE may determine whether to group the specific type of the UCI with slot based or sub-slot based HARQ-ACK PUCCH according to the priority.

In some implementations, a PUCCH may be grouped with both slot-based HARQ-ACK PUCCH and sub-slot based HARQ-ACK PUCCH. Alternatively, a PUCCH may be simultaneously grouped with both the slot-based HARQ-ACK PUCCH and the sub-slot based HARQ-ACK PUCCH under a certain condition (e.g., indication of UE capability). Whether a PUCCH grouped with both slot-based HARQ-ACK PUCCH and sub-slot based HARQ-ACK PUCCH is multiplexed with the slot based HARQ-ACK PUCCH or the sub-slot based HARQ-ACK PUCCH depends on latency, reliability and PUCCH format capacity of the overlapping PUCCHs. The multiplexing may further depend on the order of multiplexing procedures of the two groups, and/or whether the slot based HARQ-ACK PUCCH or the sub-slot based HARQ-ACK PUCCH are scheduled.

As discussed previously, a priority of the UCI may be applied for grouping. In one example, a priority of a HARQ- ACK PUCCH is based on a priority indication of an associated HARQ-ACK codebook in DCI that schedules a corresponding PDSCH. The priority indication may be provided implicitly by according to DCI format, a Radio Network Temporary Identity (RNTI) used to scramble a cyclic redundancy check (CRC), or a control resource set (CORESET) or a search space where the DCI is transmitted, or explicitly by the DCI content.

In one example, a priority of a HARQ-ACK PUCCH is based on a predefined value for the HARQ-ACK PUCCH. The predefined value may be configured by a higher layer that determines a priority for the UCI. More specifically, the higher index may indicate a higher priority. The predefined value may be a fixed value associated with a PUCCH format of the HARQ-ACK PUCCH.

In one example, a priority of CSI is based on priority rules for CSI reports. The priority of the CSI may be configured in the configuration of a CSI report (e.g., CSI-ReportConfig). A priority of CSI may be determined according to types of CSI (e.g., aperiodic CSI, semi-persistent CSI, etc.). A priority of CSI may be determined according to the content of the CSI. In one example, priority of CSI is low priority if no configuration or indication of priority is provided for the PUCCH resource carrying the CSI.

In one example, a priority of an SR is based on a priority of a logical channel (e.g., priority configured in LogicalChannelConfig) that triggers an SR procedure. For example, an SR configuration #1 with an SR ID #1 may be triggered by a logical channel with priority #1, and another SR configuration #2 with an SR ID #2 may be triggered by a logical channel with priority #2. It is noted that an SR configuration of a logical channel that triggers the Buffer Status Report (BSR) is considered as a corresponding SR configuration for the triggered SR.) For example, the SR configuration #1 may be grouped with the sub-slot based HARQ-ACK PUCCH. The SR configuration #2 may be grouped with the slot based HARQ-ACK PUCCH. More specifically, a priority of an SR configuration may be indicated by a Media Access Control (MAC) layer to a physical (PHY) layer. In one example, priority of an SR may be provided by RRC configuration of the PUCCH resource carrying the SR.

As discussed previously, a threshold may be applied for grouping. In one example, the threshold is equal to the priority of the sub-slot based HARQ-ACK PUCCH.

In one example, the threshold is equal to the priority of the sub-slot based HARQ-ACK PUCCH plus an offset.

In one example, the threshold is equal to the product of the priority of the sub-slot based HARQ-ACK PUCCH and a scaling factor. The scaling factor may be a configured value or a fixed value.

In one example, the threshold is equal to the priority of the slot based HARQ-ACK PUCCH.

In one example, the threshold is equal to the priority of the slot based HARQ-ACK PUCCH plus an offset.

In one example, the threshold is equal to the product of the priority of the slot based HARQ-ACK PUCCH and a scaling factor. The scaling factor may be a configured value or a fixed value.

The offset and scaling factor may be configured by a higher layer. The offset and scaling factor are used when a priority value range of the HARQ-ACK PUCCH and other types of PUCCH are different. For example, if the priority value is '1' for the sub-slot based HARQ-ACK PUCCH and '2' for the slot based HARQ-ACK PUCCH, and a priority value of SR PUCCH is from '1' to '16', then the threshold for SR grouping with the HARQ-ACK PUCCH may be set to the priority of the sub-slot based HARQ-ACK PUCCH multiplied by a scaling factor (e.g., 8). Thus, the SR PUCCH with priority value lower than '8' may be grouped with the sub-slot based HARQ-ACK PUCCH with the priority value of '1'. It is noted that the priority value may be configured in a PUCCH configuration, a DCI field, or predefined in the 3GPP specification.

In one example, the threshold is individually configured by a gNB for each UL BWP, and if the threshold is not configured, the UE may apply a default value predefined in the 3GPP specification.

Q Set Construction

In Rel-15 NR, a PUCCH resource set Q (e.g., Q set) is constructed in a slot for UCI multiplexing, and the UCI multiplexing procedure is applied to the PUCCH resources in the Q set in the slot. To perform more than one multiplexing procedure in a slot, more than one Q set may be constructed. In one implementation, two Q sets are constructed, each Q set includes each of the two groups previously disclosed. One Q set includes the PUCCH resources of the group with the sub-slot based HARQ-ACK PUCCH, denoted as Q1 set, and the other Q set includes PUCCH resources of the group with the slot based HARQ-ACK PUCCH, denoted as Q2 set. There are one Q1 set and one Q2 set in each slot.

In one implementation, one Q set is constructed in each sub-slot of a slot for the group with the sub-slot based HARQ-ACK PUCCH, denoted as Q1 set, and one Q set is constructed in a slot for the group with the slot based HARQ-ACK PUCCH, denoted as Q2 set. There are one or more Q1 sets and one Q2 set in each slot. In one example of this implementation, a Q1 set for a sub-slot other than the first sub-slot may be constructed after a PUCCH determination of earlier sub-slots are made, and PUCCHs overlapping with other PUCCHs determined from Q1 sets in earlier sub-slots are not included. No Q1 set may be constructed for a sub-slot.

In one implementation, two Q sets are constructed in each sub-slot of a slot. One of the Q sets is for the group with the sub-slot based HARQ-ACK PUCCH, denoted as a Q1 set, and one of the Q sets is for the group with the slot based HARQ-ACK PUCCH, denoted as a Q2 set. There are one or more Q1 sets and one or more Q2 sets in each slot. In one example, a Q1 set is for a sub-slot other than the first sub-slot and may be constructed after a PUCCH determination of earlier sub-slots is made, and PUCCHs overlapping with other PUCCHs determined from Q1 sets in earlier sub-slots are not included. For construction of a Q2 set for a sub-slot other than the first sub-slot, PUCCHs overlapping with other PUCCHs determined from Q1 sets in earlier sub-slots are not included. No Q1 set or no Q2 set may be constructed for a sub-slot.

In one implementation, Q1 set construction for a sub-slot is based on a PUCCH with the earliest starting symbol in the sub-slot. If the PUCCH is a non HARQ-ACK PUCCH and if the PUCCH overlaps at least one sub-slot based HARQ-ACK PUCCH, one sub-slot based HARQ-ACK PUCCH with the latest ending symbol is used as a reference PUCCH. Other non HARQ-ACK PUCCHs overlapping with the reference are also included in the Q1 set for the sub-slot. It is noted that multiple sub-slot based HARQ-ACK PUCCHs may be included in the Q1 set if the sub-slot based HARQ-ACK PUCCHs overlap a non HARQ-ACK PUCCH with the earliest starting symbol in the sub-slot.

In one implementation, Q2 set construction for a sub-slot is based on a PUCCH with the earliest starting symbol in the sub-slot. If the PUCCH is a non HARQ-ACK PUCCH and if the PUCCH is overlaps at least one slot based HARQ-ACK PUCCH, one slot based HARQ-ACK PUCCH with a latest ending symbol is used as a reference PUCCH. Other non HARQ-ACK PUCCHs overlapping with the reference are also included in the Q2 set for the sub-slot. It is noted that multiple slot based HARQ-ACK PUCCHs may be included in the Q2 set if the slot based HARQ-ACK PUCCHs overlap a non HARQ-ACK PUCCH with the earliest starting symbol in the sub-slot.

In one implementation, a PUCCH resource is included in a Q1 set in a sub-slot if the PUCCH resource is grouped with sub-slot HARQ-ACK PUCCH and the first symbol of the PUCCH resource is in the sub-slot.

In one implementation, one Q set including PUCCHs from the group with the sub-slot based HARQ-ACK PUCCH and from the group with the slot based HARQ-ACK PUCCH is constructed in a slot.

In one implementation, one Q set including PUCCHs from the group with the sub-slot based HARQ-ACK PUCCH and from the group with the slot based HARQ-ACK PUCCH is constructed in each sub-slot of a slot.

In one implementation, only the PUCCHs that conformed to multiplexing timeline requirements are included in a Q set. A PUCCH determined from the Q set may be dropped if the PUCCH overlaps the other PUCCH not in the Q set, and the other PUCCH is prioritized.

Overall Multiplexing/Prioritization Procedure

In one implementation, separate multiplexing procedures are performed for different Q sets, where a multiplexing procedure is performed for a Q set as in Rel-15 NR, and multiplexing procedures performed for a Q set does not affect multiplexing procedures for another Q set. In other words, once a Q set is constructed, multiplexing procedure is performed on the Q set regardless of the multiplexing progress of other Q sets, or the multiplexing procedure is performed on the Q set even PUCCH resources in the Q set overlapped the other Q sets.

In one implementation, separate multiplexing procedures are performed for different Q sets, where a multiplexing procedure is performed for a Q set as in Rel-15 NR, and multiplexing procedures performed for one Q1 set affects the multiplexing procedure for one or more Q2 sets. For example, when a PUCCH in a Q2 set overlaps a PUCCH determined from a Q1 set, the PUCCH in the Q2 set may be excluded from the Q2 set. For another example, in case a single Q2 set is constructed for a slot, the time for making a multiplexing decision for a group of overlapping PUCCHs in the Q2 set may be after the multiplexing decisions are made for the Q1 sets in the sub-slot before the start of the group of overlapping PUCCHs.

After the UCI to be multiplexed on the PUCCH is determined from a Q set, it is determined if the PUCCH overlaps a PUSCH. If the PUCCH overlaps a PUSCH, timeline requirements are checked, and if the timeline requirements are fulfilled, further determination of the achievable latency and reliability can be performed to decide whether the UCI is multiplexed on the PUSCH, or one of the channels is dropped. In one example, whether the determined UCIs can be multiplexed on the PUSCH depends on the priority of the logical channel of the data packet that the PUSCH carries.

If one or more PUCCHs are determined from one or more Q sets, and the PUCCHs overlaps a PUSCH, whether to multiplex UCI on the PUSCH or whether to drop the PUSCH may be checked with a PUCCH that is determined first. If the one or more PUCCHs are determined from the one or more Q sets simultaneously, whether to multiplex UCI on the PUSCH or whether to drop the PUSCH may be checked with the PUCCH with higher priority.

If the PUCCH determined from the group with the slot based HARQ-ACK PUCCH overlaps the PUCCH determined from the group with the sub-slot based HARQ-ACK PUCCH, the PUCCH determined from the group with the sub-slot HARQ-ACK PUCCH is transmitted, while the PUCCH determined from the group with the slot based HARQ-ACK PUCCH is dropped.

In one implementation, a first PUCCH determined from a group with a first sub-slot based HARQ-ACK PUCCH overlaps a second PUCCH determined from the group with second sub-slot based HARQ-ACK PUCCH. The first PUCCH is transmitted, while the second PUCCH is dropped if one or more following conditions are satisfied:

1. Among the sub-slot configurations configured for the first and second PUCCH, the sub-slot configuration configured for the first PUCCH has a smaller number of symbols per slot.

2. Among the sub-slot configurations configured for the first and second PUCCH, the sub-slot configuration index for the first PUCCH has a smaller value.

In one implementation, a first PUCCH determined from a group with a first sub-slot based HARQ-ACK PUCCH overlaps a second PUCCH determined from the group with second sub-slot based HARQ-ACK PUCCH. The first PUCCH is transmitted if the first sub-slot configuration is a configuration configured with a specific IE.

If the PUCCH determined from the group with slot based HARQ-ACK PUCCH is multiplexed on a PUSCH, and the PUSCH overlaps the PUCCH determined from the group with sub-slot based HARQ-ACK PUCCH, the PUSCH may be dropped.

If the PUCCH determined from the group with sub-slot based HARQ-ACK PUCCH is multiplexed on a PUSCH, and the PUSCH overlaps the PUCCH determined from the group with slot based HARQ-ACK PUCCH, the PUCCH may be dropped.

Timeline Requirements

For a group of overlapping PUCCHs, timeline requirements are defined for the time duration between the end of a PDSCH corresponding to a PUCCH in a group of overlapping PUCCH and PUSCH to the start of the earliest PUCCH or PUSCH in the group of overlapping PUCCH and PUSCH, and the time duration between the end of any scheduling DCI corresponding to a PUCCH or a PUSCH in the group of overlapping PUCCH and PUSCH to the start of the earliest PUCCH or PUSCH in the group of overlapping PUCCH and PUSCH.

In Rel-15 NR, timeline requirements are defined and a gNB may schedule DL and UL channels fulfilling the timeline requirements. In Rel-16 NR, since URLLC traffic needs to be supported, it is reasonable not to mandate the gNB to fulfill the timeline requirements. The timeline requirements are restricted to the overlapping PUCCHs that contain only slot based HARQ-ACK PUCCH and the PUCCHs grouped with it. Possible UL channels that may be scheduled without fulfilling multiplexing timeline requirements are sub-slot based HARQ-ACK PUCCH and PUSCH.

When timeline requirements for Rel-15 NR are not met, UE behavior should be disclosed.

In one scenario, the sub-slot based HARQ-ACK PUCCH is scheduled to overlap with a positive SR of the same priority, and the timeline requirements for multiplexing are not met for the two UCIs to be multiplexed. The positive SR is determined to be transmitted before the UE decodes the DCI scheduling the sub-slot based HARQ-ACK PUCCH.

In one example, the sub-slot HARQ-ACK is transmitted if the SR is not transmitted yet.

In one example, the sub-slot HARQ-ACK is not transmitted if the SR transmission has started.

In one example, the sub-slot HARQ-ACK is transmitted and the SR transmission is terminated if the SR transmission has started.

It is noted that the positive SR is determined from an overlapping group of PUCCHs, including the sub-slot based HARQ-ACK PUCCH. In other words, at the time of determination of which PUCCH is transmitted, the DCI scheduling the HARQ-ACK has not been decoded.

In one scenario, the sub-slot based HARQ-ACK PUCCH is scheduled to overlap with a PUCCH determined from the group with slot based HARQ-ACK PUCCH. In this case, the sub-slot based HARQ-ACK PUCCH is transmitted, and the PUCCH determined from the group with slot based HARQ-ACK PUCCH is terminated if the transmission has started.

In one scenario, a PUSCH is scheduled to overlap with a PUCCH determined from the group with sub-slot based HARQ-ACK PUCCH or a PUCCH determined from the group with slot based HARQ-ACK PUCCH. Whether the PUSCH is prioritized depends on the priority of the logical channel of the data packet carried on the PUSCH and the priority of the UCI carried on the PUCCH.

In Rel-16 NR, to facilitate multiplexing between PUCCHs with high priority, it is beneficial to relax the timeline requirements, since the overlapping PUCCHs carrying less UCI bits or sequence-based PUCCH are used to multiplex the UCIs. The timeline requirements may be relaxed for overlapping PUCCHs with higher priority. Relaxation can be realized by reduction of the parameters in timeline requirement equations, such as "$N_1$", "$N_2$", "$d_{1,1}$", and "$d_{2,1}$" as defined in 3GPP TS 38.214, etc. Reducing "$N_1$" and "$N_2$" may be realized by introducing a new UE capability. Reducing "$d_{1,1}$" and "$d_{2,1}$" may be realized by introducing a new UE capability or by restricting certain configuration for the PUCCH or PUSCH for a higher priority. For example, "$d_{2,1}$" may be reduced to '0' by configuring the PUSCH with a higher priority or with only a demodulation reference signal (DMRS) in the first symbol. In one example, the timeline requirement may be relaxed by one symbol. Conditions for applying the relaxation can be specified (e.g., PUCCH format and TBS limitation). The timeline requirement is disclosed.

If a UE transmits multiple overlapping PUCCHs in a slot or overlapping PUCCH(s) and PUSCH(s) in a slot, the UE may multiplex different UCI types in one PUCCH. If one of the PUCCH transmissions or PUSCH transmissions is in response to DCI format detection by the UE, the UE may multiplex all corresponding UCI types, and the UE may expect that the first symbols, of the earliest PUCCH or PUSCH, among a group of overlapping PUCCHs and PUSCHs in the slot, satisfies the following timeline conditions.

Condition 1: $s_0$ is not before a symbol with a CP starting after $T_{proc,1}^{mux}=(N_1+d_{1,1})\cdot(2048+144)\cdot\kappa\cdot 2^{-\mu}\cdot T_C$ after a last symbol of any corresponding PDSCH, where µ corresponds to the smallest Subcarrier Spacing (SCS) configuration among the SCS configuration of the PDCCH scheduling the PDSCH, the SCS configuration of the PDSCH, and the smallest SCS configuration for the group of overlapping PUCCHs and PUSCHs where the UE transmits HARQ-ACK information in response to the reception of the PDSCH. $N_1$, $d_{1,1}$, µ, κ, and $T_C$ are defined as in 3GPP TS 38.214.

Condition 2: $s_0$ is not before a symbol with a CP starting after $T_{proc,release}^{mux}=(N)\cdot(2048+144)\cdot\kappa\cdot 2^{-\mu}\cdot T_C$ after a last symbol of any corresponding SPS PDSCH release and µ corresponds to the smallest SCS configuration among the SCS configuration of the PDCCH providing the SPS PDSCH release and the smallest SCS configuration for the group of overlapping PUCCHs or overlapping PUCCHs and PUSCHs where the UE transmits HARQ-ACK information in response to the detection of the SPS PDSCH release. N, µ, κ, and $T_C$ are defined as in 3GPP TS 38.214.

Condition 3: if there is no aperiodic CSI report multiplexed in a PUSCH in the group of overlapping PUCCHs and PUSCHs, $s_0$ is not before a symbol with CP starting after $T_{proc,2}^{mux}=\max((N_2+d_{2,1})\cdot(2048+144)\cdot\kappa\cdot 2^{-\mu}\cdot T_C, d_{2,2})$ after a last symbol of:
a PDCCH with the DCI format scheduling the PUSCH; and
any PDCCH scheduling a PDSCH or SPS PDSCH release with corresponding HARQ-ACK information in an overlapping PUCCH in the slot, where µ corresponds to the smallest SCS configuration among the SCS configuration of the PDCCHs and the smallest SCS of the overlapping PUCCHs and PUSCHs, and $d_{2,1}=d_{2,2}=0$ if there is no overlapping PUSCH. $N_2$, $d_2$, µ, κ, and $T_C$ are defined as in 3GPP TS 38.214.

FIG. 1 is a diagram illustrating timing requirements for a physical downlink shared channel (PDSCH) 100 or 102 to a slot-based HARQ-ACK PUCCH 104 and a sub-slot based HARQ-ACK PUCCH 106, according to an implementation of the present disclosure. The PDSCHs 100 and 102 are out of order for the slot based HARQ-ACK PUCCH 104 and the sub-slot based HARQ-ACK PUCCH 106, as illustrated in FIG. 1. It is assumed that the sub-slot based HARQ-ACK PUCCH 106 does not overlap the slot based HARQ-ACK PUCCH 104, and the sub-slot based HARQ-ACK PUCCH 106 may or may not overlap the CSI 108. Based on the UE capability and scheduling condition (e.g., time separation of the two PDSCHs), the UE may or may not be able to process the first scheduled PDSCH 100. If the UE is not able to process the first PDSCH 100, the UE may stop the processing of the first PDSCH 100 upon reception of the second DCI 112, and the HARQ-ACK codebook of the slot based HARQ-ACK PUCCH 104 may be modified. The HARQ-ACK bits corresponding to PDSCH 100 in the HARQ-ACK codebook for the slot based HARQ-ACK PUCCH 104 may all be set to negative-acknowledgment (NACK) or the HARQ-ACK bits for the Code Block Groups (CBGs) of the TB in PDSCH 100 that are not processed are set to NACK. It is noted that, if UE stops the processing of the first PDSCH 100 upon reception of the second DCI 112, the UE may instruct an upper layer (e.g., the MAC layer) to stop the corresponding HARQ process.

In an example, if the UE stops the processing of the first PDSCH 100 upon reception of the second DCI 112, the PHY layer may receive a HARQ-ACK feedback instruction from the MAC layer, the PHY layer may ignore the instruction corresponding to the HARQ process of a first DCI 110. Moreover, if the UE stops the processing of the first PDSCH 100 upon reception of the second DCI 112, the UE may replace the transport block (TB) stored in a soft buffer with the received TB.

In one scenario, the first PDSCH 100 is out of order with a second PDSCH 102. It is assumed that the first HARQ-ACK PUCCH may or may not overlap a second HARQ-ACK PUCCH. The UE may stop the processing of the first PDSCH 100 upon reception of the DCI 112 of the second PDSCH 102 if the second HARQ-ACK PUCCH of the second PDSCH 102 is within sub-slot configuration while the first HARQ-ACK PUCCH of the first PDSCH 100 is within slot configuration.

In one scenario, the first PDSCH 100 is out of order with a second PDSCH 102. It is assumed that the first HARQ-ACK PUCCH may or may not overlap the second HARQ-ACK PUCCH. The UE may stop the processing of the first PDSCH 100 upon reception of the DCI 112 of the second PDSCH 102 if both of the first and second HARQ-ACK PUCCH are within different sub-slot configurations and the number of symbols contained in a sub-slot for the second sub-slot configuration is less than the number of symbols contained in a sub-slot for first sub-slot configuration.

In case that the HARQ-ACK codebook needs to be modified, the DCI 112 scheduling the second PDSCH 102 should satisfy the $T_{proc,2}^{mux}$ timeline requirement, even though the sub-slot based HARQ-ACK PUCCH 106 does not overlap the slot based HARQ-ACK PUCCH 104. In other words, the DCI 112 scheduling the second PDSCH 102 should end before $T_{proc,2}^{mux}$ prior to the start of the overlapping PUCCHs with slot-based HARQ-ACK PUCCH 104. Since the timeline requirement may be restrictive, it is beneficial to specify the UE's behavior when the timeline requirement is not met. For example, in case that a PUCCH with the earliest starting symbol does not satisfy the timeline requirement, the PUCCH is excluded from the overlapping PUCCHs before the multiplexing procedure is performed. The exclusion of PUCCHs is until timeline requirements for the remaining overlapping PUCCHs are met, or until the slot-based HARQ-ACK PUCCH 104 remains. As illustrated in FIG. 1, in case $T_{proc,2}^{mux}$ prior to the start of CSI 108 is before the end of the DCI 112 scheduling the second PDSCH 102, the CSI 108 is dropped.

Figure 2:
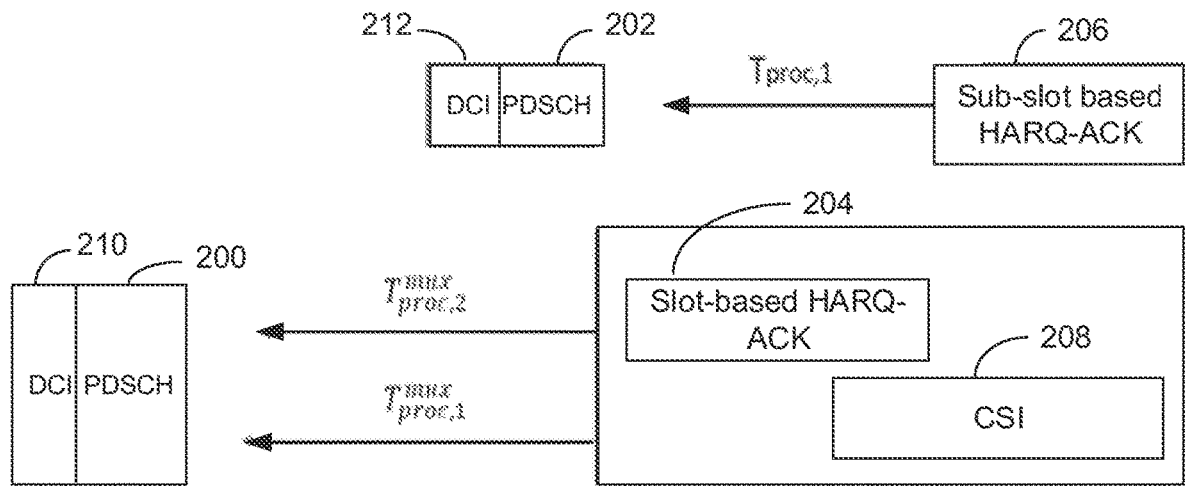

In one scenario, the PDSCHs 200 and 202 are in-order for the slot-based HARQ-ACK PUCCH 204 and sub-slot based HARQ-ACK PUCCH 206, as illustrated in FIG. 2. It is assumed that the sub-slot based HARQ-ACK PUCCH 206 does not overlap the slot-based HARQ-ACK PUCCH 204, and the sub-slot based HARQ-ACK PUCCH 206 may or may not overlap the CSI 208. Based on the UE capability and the scheduling condition (e.g., time separation of the two PDSCHs), the UE may or may not be able to process the first scheduled PDSCH 200. If the UE is not able to process the first PDSCH 200, the UE may stop the processing of the first PDSCH 200 upon reception of the second DCI 212, and the HARQ-ACK codebook of the slot based HARQ-ACK PUCCH 204 may be modified. The HARQ-ACK bits corresponding to PDSCH 200 in the HARQ-ACK codebook for the slot based HARQ-ACK PUCCH 204 may all be set to NACK or the HARQ-ACK bits for the CBGs of the TB in PDSCH 200 that are not processed are set to NACK. In case that the first PDSCH 200 is scheduled with PDSCH processing capability 2 (as defined in Section 5.3 in 3GPP TS 38.214), with more than 136 RBs, and the ending symbol is within 10 symbols of the start of the second PDSCH 202 that is scheduled to follow PDSCH processing capability 2 (as defined in Section 5.3 in 3GPP TS 38.214), the first PDSCH 200 may be dropped.

For the above cases, for multiplexing PUCCHs, the $T_{proc,2}^{mux}$ timeline requirement should be satisfied between the scheduling DCI 212 of the second PDSCH 202 and the group of overlapping PUCCHs with the slot based HARQ-ACK PUCCH 204, even though the sub-slot based HARQ-ACK PUCCH 206 does not overlap the slot based HARQ-ACK PUCCH 204.

Since the timeline requirement may be restrictive, it is beneficial to specify the UE's behavior when the timeline requirement is not met. For example, in case that a PUCCH with the earliest starting symbol does not satisfy the timeline requirement, the PUCCH is excluded from the overlapping PUCCHs before the multiplexing procedure is performed or the UE may not expect the resource that does not satisfy the timeline requirement to overlap with any other PUCCH or PUSCH. The exclusion of PUCCHs is until the timeline requirement for the remaining overlapping PUCCHs is met, or until only the slot based HARQ-ACK PUCCH remains. In addition, in case that a time duration between the end of the DCI scheduling the second PDSCH and the start of the slot-based HARQ-ACK PUCCH is less than $T_{proc,2}$, the UE may drop the slot-based HARQ-ACK PUCCH, if the transmission has started.

Multiplexing Order

In a sub-slot where both PUCCHs overlap a slot-based HARQ-ACK PUCCH and PUCCHs that overlap a sub-slot based HARQ-ACK PUCCH exist, a multiplexing procedure for which Q set should be performed first may depend on the factors discussed above, such as whether a PUCCH is included in more than one Q set and more than one Q set contains PUCCH resources from both the group of PUCCH resources grouped with slot based HARQ-ACK PUCCH and the group of PUCCH resources grouped with sub-slot based HARQ-ACK PUCCH, whether construction of a Q set in a sub-slot is after a multiplexing procedure is performed for Q sets in sub-slots before the sub-slot, PDSCH processing capability, etc. In the scenario that a PUCCH is only grouped with either the slot based HARQ-ACK PUCCH or the sub-slot based HARQ-ACK PUCCH, the multiplexing order may simply be determined from the starting symbol of the overlapping PUCCHs, such that the overlapping group with an earlier starting symbol is determined first. In case the starting symbol of the slot or sub-slot in which Q sets are constructed is the same, the multiplexing order for the Q sets can be fixed or arbitrary. For example, multiplexing procedure for the Q set containing PUCCH resources with a higher priority is performed first.

Figure 3:
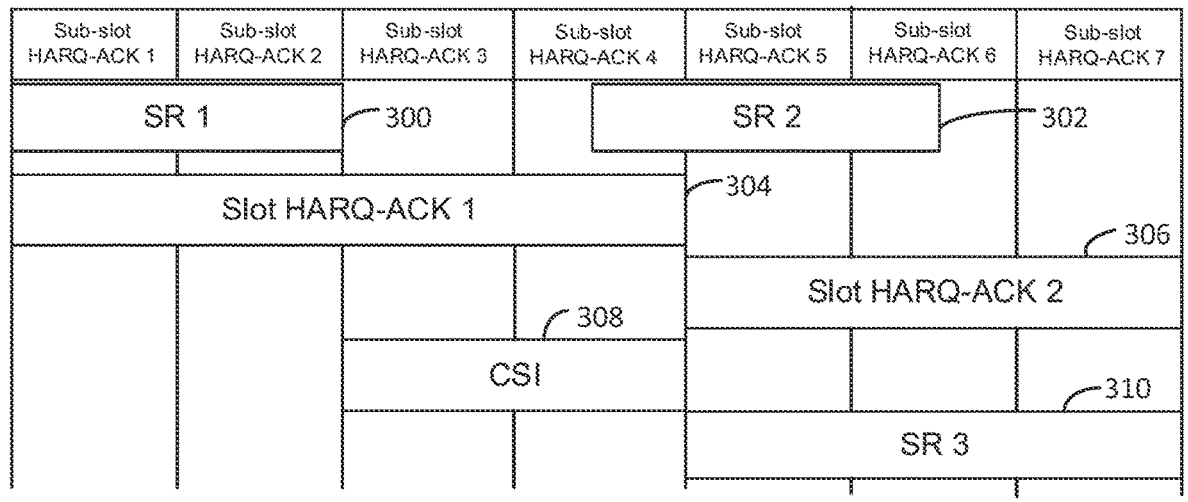
FIG. 3 is a diagram illustrating a sub-slot HARQ-ACK PUCCH grouping, according to an implementation of the present disclosure.

FIG. 3 is a diagram illustrating a Q set construction and multiplexing procedure in a slot including both slot-based HARQ-ACK PUCCH and sub-slot based HARQ-ACK PUCCH, according to an implementation of the present disclosure. In this example, up to one Q1 set and one Q2 set are constructed for a sub-slot. FIG. 3 illustrates the UL channels for this example. It is assumed that SR 1 300 and SR 2 302 are configured with a higher priority, and may be grouped with the sub-slot HARQ-ACK PUCCH (e.g., from "sub-slot HARQ-ACK 1" to "sub-slot HARQ-ACK 7"). Other UL channels are grouped with the slot-based HARQ-ACK PUCCHs 304 and 306 (e.g., "slot HARQ-ACK 1" and "slot HARQ-ACK 2").

In the first sub-slot, since the SR 1 300 is started earliest in the first sub-slot and with the longest duration of the PUCCHs that may be included in the Q1 set, the SR 1 300 is determined as the reference resource for construction of the Q1 set in the first sub-slot. Since two sub-slot based HARQ-ACK PUCCHs ("sub-slot HARQ-ACK 1" and "sub-slot HARQ-ACK 2" overlap the reference resource (e.g., the SR 1 300), they are included in the Q1 set in the first sub-slot. For a Q2 set in the first sub-slot, the slot-based HARQ-ACK PUCCH 304 (e.g., "slot HARQ-ACK 1") is determined as the reference resource, and the overlapping resource in the same group (e.g., the CSI 308 is included in the Q2 set in the first sub-slot).

In the second sub-slot, since no resources are left, the Q1 set and Q2 set are not constructed.

In the third sub-slot, the sub-slot based HARQ-ACK PUCCH (e.g., "sub-slot HARQ-ACK 3") is included in the Q1 set in the third sub-slot.

In the fourth sub-slot, the sub-slot based HARQ-ACK PUCCH (e.g., "sub-slot HARQ-ACK 4") is determined as the reference resource, and the overlapping resource in the same group, (e.g., the SR 2 302 is included in the Q1 set in the fourth sub-slot).

In the fifth sub-slot, the sub-slot based HARQ-ACK PUCCH (e.g., "sub-slot HARQ-ACK 5") is included in the Q1 set in the fifth sub-slot. For the Q2 set in the fifth sub-slot, the slot-based HARQ-ACK PUCCH 2 306 is determined as the reference resource, and the overlapping resource in the same group (e.g., the SR3 310 is included in the Q2 set in the fifth sub-slot).

In the sixth sub-slot, the sub-slot based HARQ-ACK PUCCH (e.g., "sub-slot HARQ-ACK 6") is included in the Q1 set.

In the seventh sub-slot, the sub-slot based HARQ-ACK PUCCH (e.g., "sub-slot HARQ-ACK 7") is included in the Q1 set.

It is noted that, when constructing a Q1 set or Q2 set in a sub-slot if a PUCCH is overlapped with a PUCCH determined to be transmitted in previous sub-slots with the same or higher priority, the PUCCH is not included in the Q1 set or Q2 set in the sub-slot.

To summarize, the Q1 and Q2 sets in each sub-slot are constructed as follows.

First sub-slot: the Q1 set in the first sub-slot includes "sub-slot HARQ-ACK 1", "sub-slot HARQ-ACK 2", and SR 1 300. The Q2 set in the first sub-slot includes "slot HARQ-ACK 1", and CSI 308.

Second sub-slot: no Q1 set or Q2 set is constructed.

Third sub-slot: the Q1 set in the third sub-slot includes "sub-slot HARQ-ACK 3".

Fourth sub-slot: the Q1 set in the fourth sub-slot includes "sub-slot HARQ-ACK 4" and SR 2 302.

Fifth sub-slot: the Q1 set in the fifth sub-slot may not be constructed if SR 2 302 has been determined to be transmitted in the previous sub-slot and SR 2 302 has higher priority. Otherwise, the Q1 set in the fifth sub-slot includes "sub-slot HARQ-ACK 5". The Q2 set in the fifth sub-slot may not be constructed if SR 2 302 is transmitted. Otherwise, the Q2 set in the fifth sub-slot includes "slot HARQ-ACK 2", and SR 3 310. It is noted that construction of the Q2 set may not necessarily be dependent on the existence of slot-based HARQ-ACK. For example, if "slot HARQ-ACK 2" was not configured, then the Q2 set is formed by SR 3 310 for the fifth sub-slot.

Sixth sub-slot: the Q1 set in the sixth sub-slot may not be constructed if SR 2 302 has been determined to be transmitted in the previous sub-slot and SR 2 302 has higher priority. Otherwise, the Q1 set in the sixth sub-slot includes "sub-slot HARQ-ACK 6".

Seventh sub-slot: the Q1 set in the seventh sub-slot includes "sub-slot HARQ-ACK 7".

Figure 4:
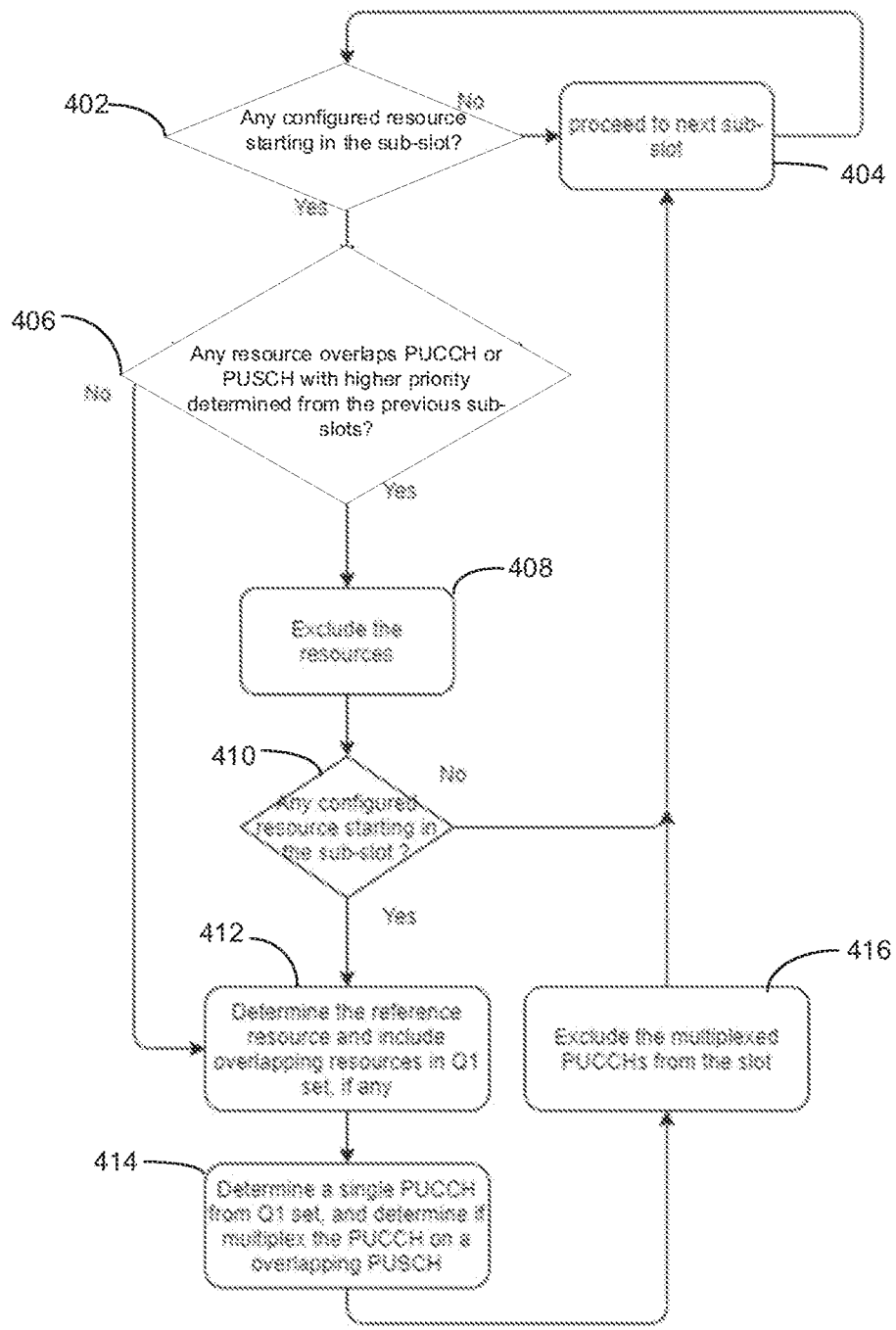
FIG. 4 is a flowchart illustrating construction of a set of PUCCH resources according to an implementation of the present disclosure.

FIG. 4 is a flowchart illustrating construction of a set of PUCCH resources, according to an implementation of the present disclosure. As illustrated in FIG. 4, a Q set construction in each sub-slot in a slot is illustrated. A procedure for Q1 set construction can be summarized in the flow chart illustrated in FIG. 4. For Q2 set construction, a similar procedure may be performed in the same manner. The UE determines whether any configured resource is starting in the sub-slot (action 402). If no configured resource is starting in the sub-slot, the UE proceeds to the next sub-slot (action 404). If yes, the UE determines whether any resource overlaps PUCCH or PUSCH with higher priority determined from the previous sub-slots (action 406). If there is a resource overlapping PUCCH or PUSCH, the UE may exclude the resources (action 408). In addition, the UE determines if any configured resource starts in the sub-slot (action 410). Info configured resource starts in the sub-slot, the UE proceeds to the next sub-slot (action 404). On the other hand, if a configured resource starts in the sub-slot, the UE determines the reference resource and includes the overlapping resources in the Q1 set (action 412).

It is noted that, as illustrated in FIG. 4, the UE further determines a single PUCCH from the Q1 set and the multiplexed UCIs from PUCCH resources included in the Q1 set, and determines if there is multiplexing of the PUCCH on an overlapping PUSCH (action 414). In one alternative, at most two PUCCH resources and multiplexed UCIs for each PUCCH resource may be determined from the PUCCH resources included in the Q1 set. The at most two PUCCH resources include at most one sub-slot HARQ-ACK PUCCH. In addition, the UE excludes the multiplexed PUCCHs from the slot (action 416). In one alternative, the multiplexed PUCCHs refer to all PUCCH resources included in the Q1 set in the sub-slot.

Furthermore, in one example, Q sets are constructed per slot. Two Q sets (e.g., Q1 set and Q2 set) are determined for each slot. The Q1 set contains all the configured PUCCHs grouped with a sub-slot based HARQ-ACK PUCCH in the slot, and the Q2 set contains all the configured PUCCHs grouped with a slot-based HARQ-ACK PUCCH in the slot, except for the PUCCHs that are excluded.

The multiplexing procedure starts from the first sub-slot of a slot, and is performed in each sub-slot until the last sub-slot of the slot. In each sub-slot, up to two multiplexing procedures are performed.

For a first multiplexing procedure, in each sub-slot, a resource A1 is determined following the priority order of the earliest starting symbol (within the sub-slot) followed by the longest duration from the Q1 set. A resource set X1 that contains the PUCCHs overlapping the resource A1 is determined from the Q1 set. The resource set X1 should contain only the HARQ-ACK PUCCHs with the starting symbol contained in the sub-slot. A single PUCCH and the UCIs to be multiplexed on the PUCCH are determined from resource A1 and resource set X1. It is noted that resource set X1 may not exist and no PUCCH or no UCI is determined when the sub-slot HARQ-ACK PUCCH is not scheduled.

Resource exclusion may be performed for the Q1 set. After a multiplexing decision is made in a sub-slot, resources may be excluded from the Q1 set if it overlaps a scheduled sub-slot HARQ-ACK PUCCH in previous sub-slots.

For a second multiplexing procedure, in a sub-slot that contains the first symbol of a group of overlapping PUCCHs in a Q2 set, a resource A2 is determined following the priority order of the earliest starting symbol followed by the longest duration from the Q2 set, if there is PUCCH with starting symbol in the sub-slot. A resource set X2 that contains the PUCCHs overlapping resource A2 is determined from the Q2 set. A single PUCCH and the UCIs to be multiplexed on the PUCCH are determined from resource A2 and resource set X2. The determined single PUCCH and the UCIs replace resource A2 and resource set X2, and the procedure is performed until there are no remaining PUCCHs overlapping the determined PUCCH.

Resource exclusion may be performed for the Q2 set. After the multiplexing decision is made in a sub-slot, resources may be excluded from the Q2 set if it overlaps a scheduled sub-slot HARQ-ACK PUCCH or other PUCCH with a higher priority in previous sub-slots.

The first and second multiplexing procedures may be performed in turn. That is, after the first multiplexing procedure in the previous sub-slots is completed, the second multiplexing procedure in the current sub-slot is performed.

The order of performing the first and second multiplexing procedures can be the following.

In one implementation, the order of performing the first multiplexing procedure and the second multiplexing procedure in a sub-slot is at the same time.

In one implementation, the order of performing the first multiplexing procedure and the second multiplexing procedure in a sub-slot is the first multiplexing procedure followed by the second multiplexing procedure.

In one implementation, the order of performing the first multiplexing procedure and the second multiplexing procedure in a sub-slot is the second multiplexing procedure followed by the first multiplexing procedure.

In one implementation, the order of performing the first multiplexing procedure and the second multiplexing procedure in a sub-slot depends on whether resource A1 or resource A2 in the sub-slot has an earlier starting symbol.

For multiplexing on a PUSCH, the determined UCIs from the first multiplexing procedure or second multiplexing procedure are multiplexed in a PUSCH if the determined PUCCH overlaps the PUSCH and the timeline requirements for multiplexing the PUCCH and PUSCH are met.

In one implementation, the condition for multiplexing the PUCCH and PUSCH also depends on the achievable reliability of the PUSCH.

In addition, prioritization for the two PUCCHs is determined according to different multiplexing procedures.

A PUCCH determined from the Q2 set is dropped if a PUCCH determined from the Q1 set overlaps the PUCCH of the Q2 set.

Prioritization of two PUCCHs is determined for different sub-slots in the Q1 set.

A PUCCH determined from a sub-slot (can be from Q1 set or Q2 set) may overlap a sub-slot HARQ-ACK PUCCH scheduled in a later sub-slot, and the two overlapping PUCCHs may not satisfy multiplexing timeline requirements. In this case, the PUCCH determined from the previous sub-slot is dropped and the sub-slot HARQ-ACK PUCCH is transmitted if it is determined that the sub-slot HARQ-ACK PUCCH has higher priority.

Figure 5:
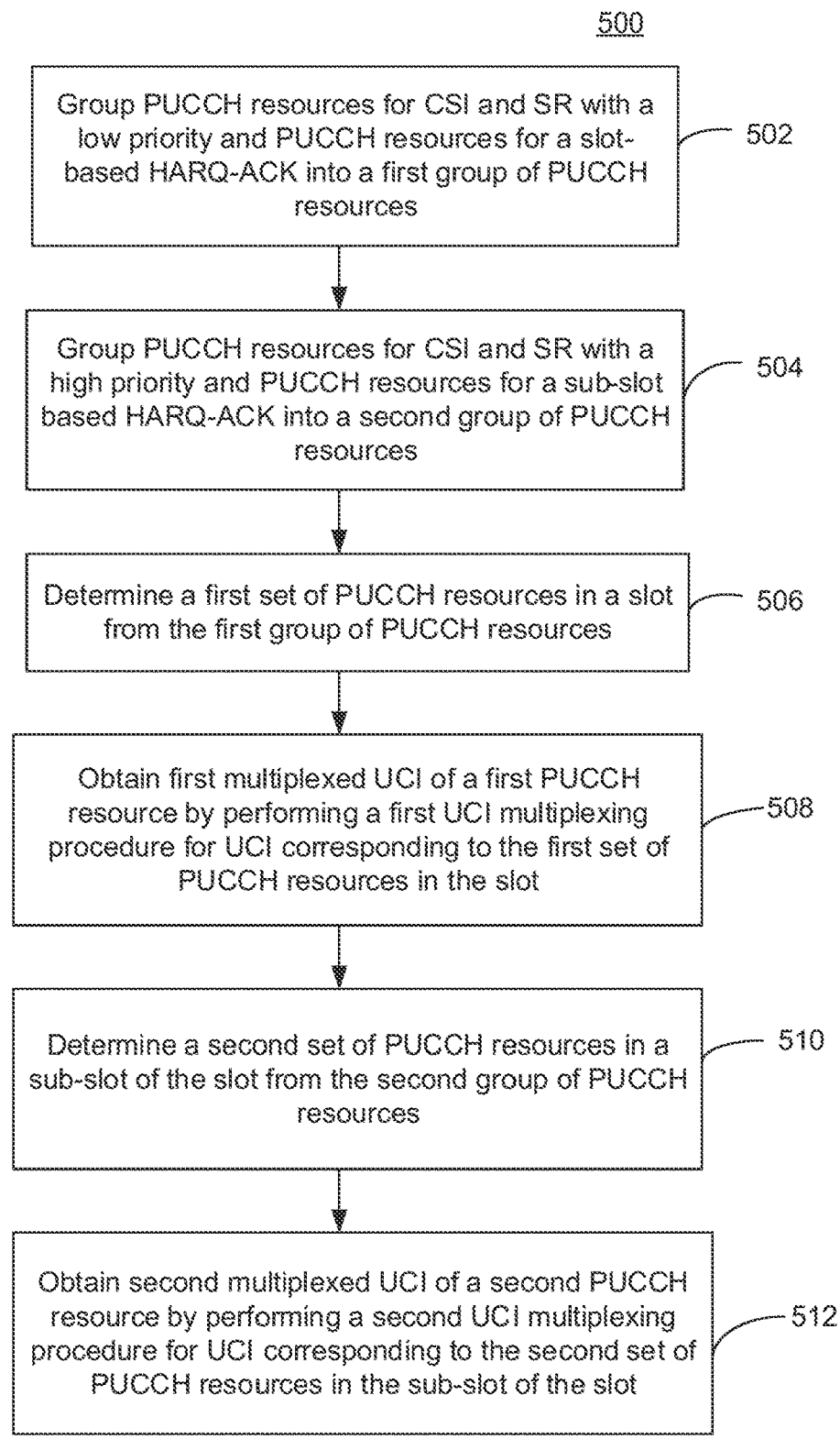
FIG. 5 is a flowchart illustrating a method for multiplexing UCI, according to an implementation of the present disclosure.

FIG. 5 is a flowchart illustrating a method 500 for multiplexing UCI (e.g., CSI and SR), according to an implementation of the present disclosure. FIG. 5 illustrates a UE performing a UCI multiplexing procedure. In action 502, the UE groups PUCCH resources for CSI and SR with a low priority and PUCCH resources for a slot-based HARQ-ACK into a first group of PUCCH resources. In action 504, the UE groups PUCCH resources for CSI and SR with a high priority and PUCCH resources for a sub-slot based HARQ-ACK into a second group of PUCCH resources. In action 506, the UE determines a first set of PUCCH resources in a slot from the first group of PUCCH resources. In action 508, the UE obtains first multiplexed UCI of a first PUCCH resource by performing a first UCI multiplexing procedure for UCI corresponding to the first set of PUCCH resources in the slot. In action 510, the UE determines a second set of PUCCH resources in a sub-slot of the slot from the second group of PUCCH resources. In action 512, the UE obtains second multiplexed UCI of a second PUCCH resource by performing a second UCI multiplexing procedure for UCI corresponding to the second set of PUCCH resources in the sub-slot of the slot. It is noted that there is no timing order between action 502 and action 504. It is noted that there is no timing order between action 506 and action 510. It is noted that there is no timing order between action 508 and action 512.

Figure 6:
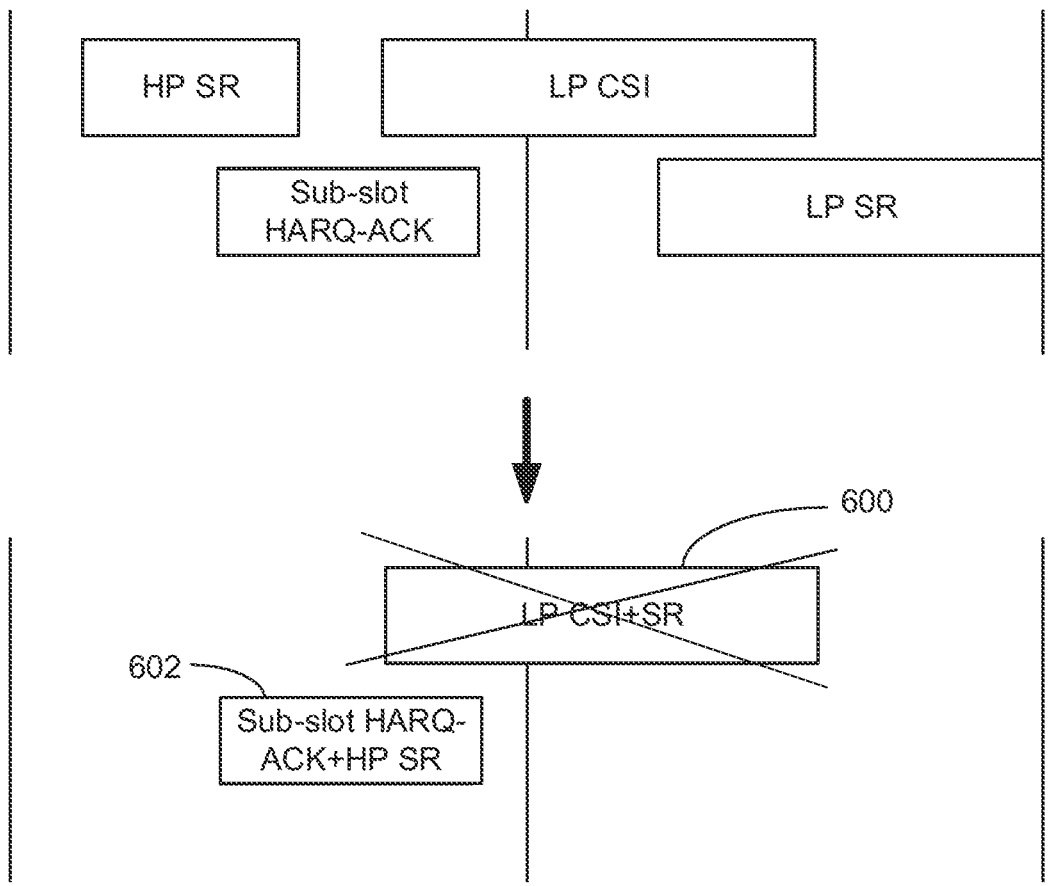
FIG. 6 is a diagram illustrating a slot-based HARQ-ACK PUCCH overlapping a sub-slot based HARQ-ACK PUCCH, according to an implementation of the present disclosure.

Based on the method 500 in FIG. 5, several cases for UCI multiplexing and transmission are disclosed. With reference to FIG. 6, the SR with high priority (e.g., "HP SR" and the sub-slot based HARQ-ACK (e.g., "sub-slot HARQ-ACK") are grouped, and CSI with low priority (e.g., "LP CSI") and SR with low priority (e.g., "LP SR") are grouped. In addition, the UE determines a first PUCCH resource set in the slot including "LP CSI" and "LP SR", and perform the UCI multiplexing procedure for the first PUCCH resource set to obtain the multiplexed UCI (e.g., "LP CSI+SR"), and the UE determines a second PUCCH resource set including "HP SR" and "sub-slot HARQ-ACK" in the first sub-slot of the slot, and performs the UCI multiplexing procedure for the second PUCCH resource set, in order to obtain the multiplexed UCI (e.g., "sub-slot HARQ ACK+HP SR").

FIG. 6 is a diagram illustrating a slot-based HARQ-ACK PUCCH overlapping a sub-slot based HARQ-ACK PUCCH, according to an implementation of the present disclosure. As illustrated in FIG. 6, the UE transmits the multiplexed UCI (e.g., "LP CSI+SR") only if the PUCCH resource 600 for transmitting "LP CSI+SR" does not overlap the PUCCH resource 602 for transmitting "sub-slot HARQ ACK+HP SR". Otherwise, the UE dose not transmit the multiplexed UCI (e.g., "LP CSI+SR").

Figure 7:
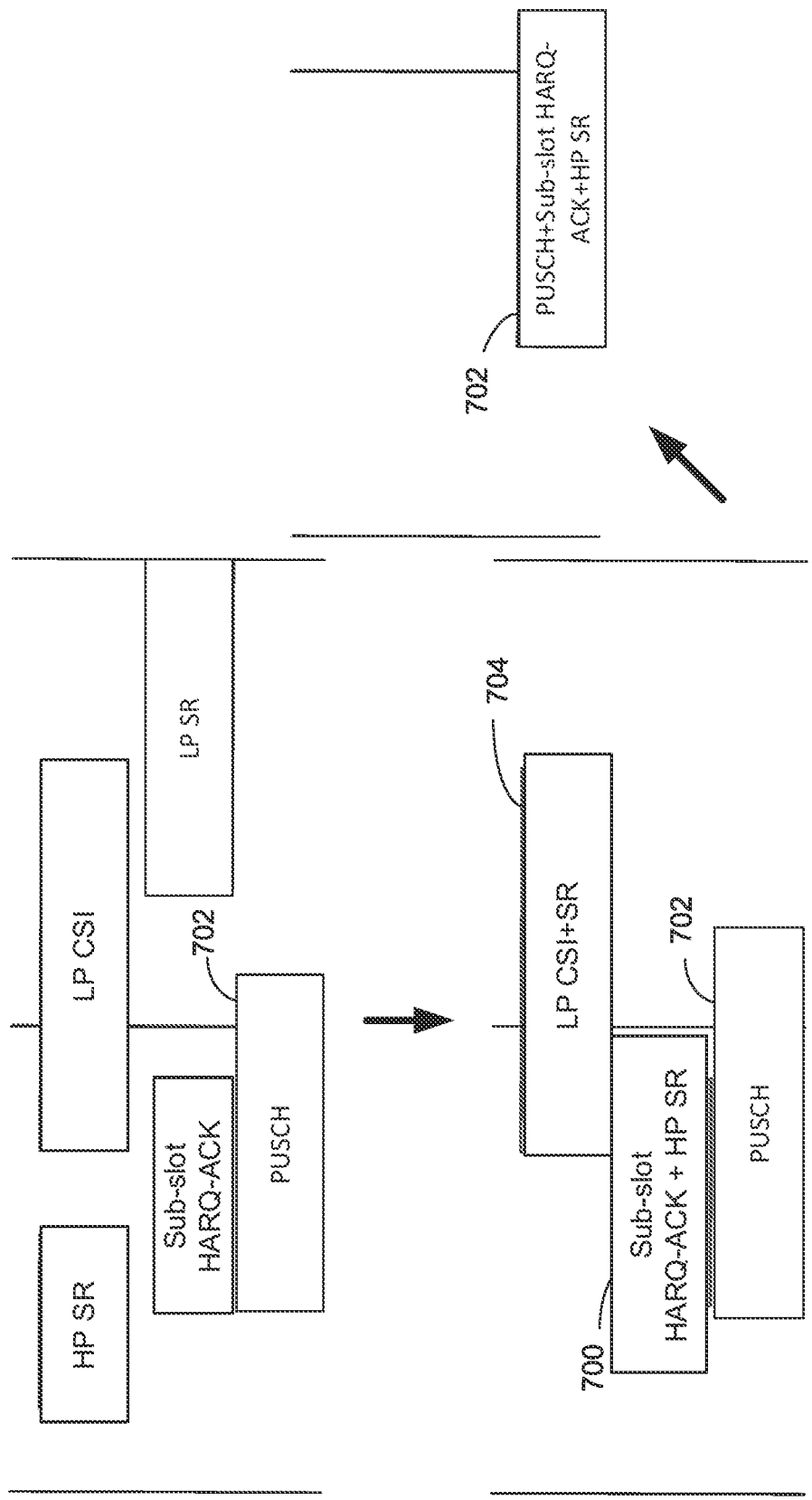
FIG. 7 is a diagram illustrating a sub-slot based HARQ-ACK PUCCH overlapping a slot-based HARQ-ACK PUCCH, according to an implementation of the present disclosure.

FIG. 7 is a diagram illustrating a sub-slot based HARQ-ACK PUCCH overlapping a slot-based HARQ-ACK PUCCH, according to an implementation of the present disclosure. As illustrated in FIG. 7, the UE multiplexes the PUCCH resource 700 for transmitting "sub-slot HARQ ACK+HP SR" on the PUSCH resource 702 when the PUSCH resource 702 overlaps the PUCCH resource 700, and may multiplex the PUCCH resource 704 for transmitting "LP CSI+SR" on the PUSCH resource 702 when the PUSCH resource 702 overlaps the PUCCH resource 704 but does not overlap the PUCCH resource 700. In this case, since the PUSCH resource 702 overlaps both the PUCCH resource 704 and the PUCCH resource 700, the UE multiplexes only the PUCCH resource 700 for transmitting "sub-slot HARQ ACK+HP SR" on the PUSCH resource 702, and transmits the "sub-slot HARQ ACK+HP SR" with the PUSCH resource 702.

Figure 8:
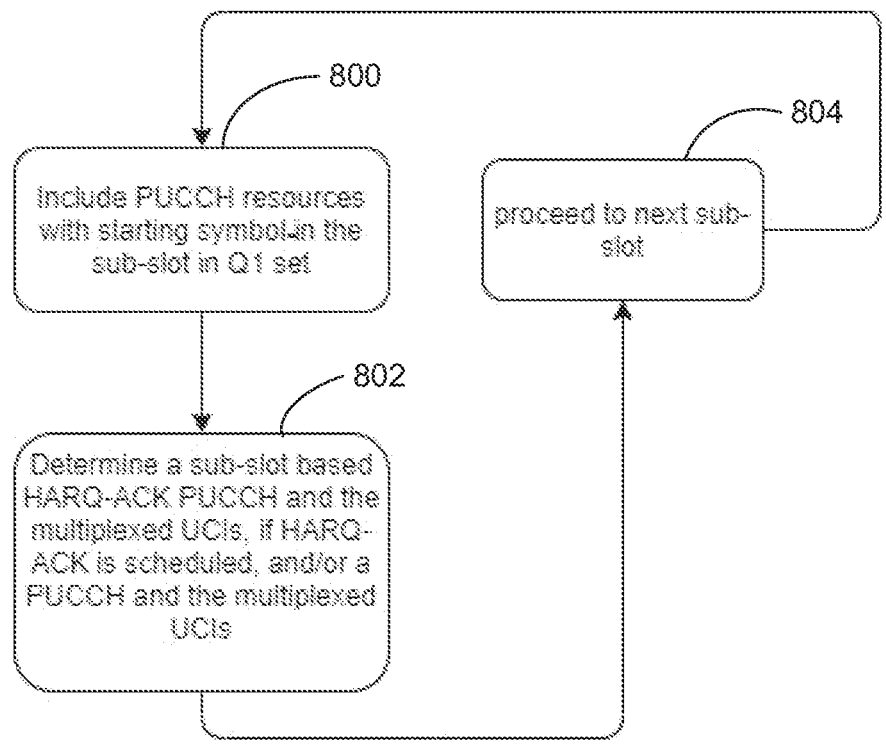
FIG. 8 is a flowchart illustrating a PUCCH resource grouped with a sub-slot HARQ-ACK PUCCH, according to an implementation of the present disclosure.

FIG. 8 is a flowchart illustrating a PUCCH resource grouped with a sub-slot HARQ-ACK PUCCH, according to an implementation of the present disclosure. As illustrated in FIG. 8, the UE may include PUCCH resources with starting symbols in the sub-slot of the slot (e.g., action 800) in the second set of PUCCH resources (e.g., CSI and/or SR with a high priority and sub-slot based HARQ-ACK as illustrated in action 504 of FIG. 5), and UE may determine a PUCCH resource by performing multiplexing procedure on the second set of PUCCH resources (e.g., action 802). The UE may then proceed to the next sub-slot of the slot (e.g., action 804).

Figure 9:
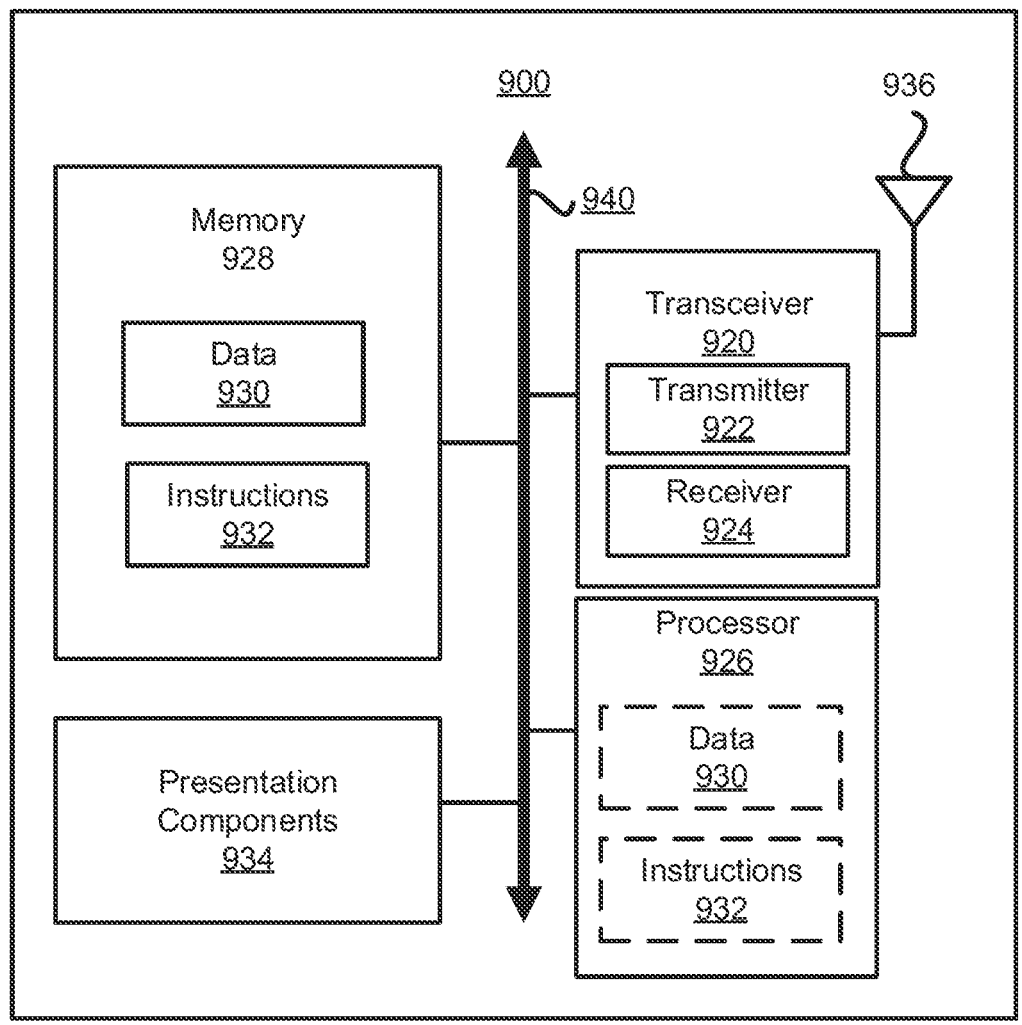
FIG. 9 is a block diagram illustrating a node for wireless communication, according to an implementation.

FIG. 9 is a block diagram illustrating a node 900 for wireless communication according to an implementation of the present disclosure.

As illustrated in FIG. 9, the node 900 may include a transceiver 920, a processor 926, a memory 928, one or more presentation components 934, and at least one antenna 936. The node 900 may also include a Radio Frequency (RF) spectrum band module, a BS communications module, a network communications module, and a system communications management module, input/output (I/O) ports, I/O components, and a power supply (not illustrated in FIG. 9). Each of these components may be in communication with each other, directly or indirectly, over one or more buses 940. The node 900 may be a UE or a BS that performs various disclosed functions as illustrated in FIG. 5.

The transceiver 920 may include a transmitter 922 (with transmitting circuitry) and a receiver 924 (with receiving circuitry) and may be configured to transmit and/or receive time and/or frequency resource partitioning information. The transceiver 920 may be configured to transmit in different types of subframes and slots including, but not limited to, usable, non-usable and flexibly usable subframes and slot formats. The transceiver 920 may be configured to receive data and control channels.

The node 900 may include a variety of computer-readable media. Computer-readable media may be any media that can be accessed by the node 900 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 928 may include computer-storage media in the form of volatile and/or non-volatile memory. The memory 928 may be removable, non-removable, or a combination thereof. For example, the memory 928 may include solid-state memory, hard drives, optical-disc drives, etc. As illustrated in FIG. 9, the memory 928 may store computer-readable and/or computer-executable instructions 932 (e.g., software codes) that are configured to, when executed, cause the processor 926 (e.g., processing circuitry) to perform various disclosed functions. Alternatively, the instructions 932 may not be directly executable by the processor 926 but may be configured to cause the node 900 (e.g., when compiled and executed) to perform various disclosed functions.

The processor 926 may include an intelligent hardware device, a central processing unit (CPU), a microcontroller, an ASIC, etc. The processor 926 may include memory. The processor 926 may process the data 930 and the instructions 932 received from the memory 928, and information through the transceiver 920, the baseband communications module, and/or the network communications module. The processor 926 may also process information to be sent to the transceiver 920 for transmission via the antenna 936, to the network communications module for transmission to a CN.

One or more presentation components 934 may present data to a person or other devices. Presentation components 934 may include a display device, a speaker, a printing component, a vibrating component, etc.

From the present disclosure, it is evident that various techniques can be utilized for implementing the concepts of the present disclosure without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method for a base station (BS) for processing multiplexed uplink control information (UCI) received from a user equipment (UE), the method comprising:
   grouping physical uplink control channel (PUCCH) resources for Channel State Information (CSI) and a Scheduling Request (SR) with a low priority and PUCCH resources for a slot-based hybrid automatic repeat request acknowledgement (HARQ-ACK) into a first group of PUCCH resources;
   grouping PUCCH resources for CSI and an SR with a high priority and PUCCH resources for a sub-slot based HARQ-ACK into a second group of PUCCH resources;
   determining a first set of PUCCH resources in a slot from the first group of PUCCH resources;
   obtaining first multiplexed UCI of a first PUCCH resource by performing a first UCI multiplexing procedure for UCI corresponding to the first set of PUCCH resources in the slot;
   determining a second set of PUCCH resources in a sub-slot of the slot from the second group of PUCCH resources; and
   obtaining second multiplexed UCI of a second PUCCH resource by performing a second UCI multiplexing procedure for UCI corresponding to the second set of PUCCH resources in the sub-slot of the slot.

2. The method of claim 1, further comprising:
   receiving, from the UE, the second multiplexed UCI in response to the first PUCCH resource overlapping the second PUCCH resource.

3. The method of claim 1, further comprising:
   receiving, from the UE, the second multiplexed UCI in response to the first PUCCH resource not overlapping the second PUCCH resource.

4. The method of claim 1, further comprising:
   receiving, from the UE, the first multiplexed UCI in response to the first PUCCH resource not overlapping the second PUCCH resource.

5. The method of claim 1, further comprising:
   receiving, from the UE, the second multiplexed UCI on a PUSCH resource in response to the PUSCH resource overlapping the second PUCCH resource; and
   receiving, from the UE, the first multiplexed UCI on the PUSCH resource in response to the PUSCH resource overlapping the first PUCCH resource and not overlapping the second PUCCH resource.

6. The method of claim 1, wherein determining the second set of PUCCH resources comprises:
   determining a particular PUCCH resource of the second group of PUCCH resources to be in the second set of PUCCH resources in response to a first symbol of the particular PUCCH resource being in the sub-slot of the slot.

7. A base station (BS) for processing multiplexed uplink control information (UCI) received from a user equipment (UE), the BS comprising:
   at least one processor; and
   at least one memory coupled to the at least one processor, the at least one memory storing computer-executable instructions that, when executed by the at least one processor, cause the BS to:
   group physical uplink control channel (PUCCH) resources for Channel State Information (CSI) and a Scheduling Request (SR) with a low priority and PUCCH resources for a slot-based hybrid automatic repeat request acknowledgement (HARQ-ACK) into a first group of PUCCH resources;
   group PUCCH resources for CSI and an SR with a high priority and PUCCH resources for a sub-slot based HARQ-ACK into a second group of PUCCH resources;
   determine a first set of PUCCH resources in a slot from the first group of PUCCH resources;
   obtain first multiplexed UCI of a first PUCCH resource by performing a first UCI multiplexing procedure for UCI corresponding to the first set of PUCCH resources in the slot;
   determine a second set of PUCCH resources in a sub-slot of the slot from the second group of PUCCH resources; and
   obtain second multiplexed UCI of a second PUCCH resource by performing a second UCI multiplexing procedure for UCI corresponding to the second set of PUCCH resources in the sub-slot of the slot.

8. The BS of claim 7, wherein the computer-executable instructions, when executed by the at least one processor, further cause the UE to:
   receive, from the UE, the second multiplexed UCI in response to the first PUCCH resource overlapping the second PUCCH resource.

9. The BS of claim 7, wherein the computer-executable instructions, when executed by the at least one processor, further cause the UE to:
   receive, from the UE, the second multiplexed UCI in response to the first PUCCH resource not overlapping the second PUCCH resource.

10. The BS of claim 7, wherein the computer-executable instructions, when executed by the at least one processor, further cause the UE to:
    receive, from the UE, the first multiplexed UCI in response to the first PUCCH resource not overlapping the second PUCCH resource.

11. The BS of claim 7, wherein the computer-executable instructions, when executed by the at least one processor, further cause the UE to:
    receive, from the UE, the second multiplexed UCI on a PUSCH resource in response to the PUSCH resource overlapping the second PUCCH resource; and
    receive, from the UE, the first multiplexed UCI on the PUSCH resource in response to the PUSCH resource overlapping the first PUCCH resource and not overlapping the second PUCCH resource.

12. The BS of claim 7, wherein determining the second set of PUCCH resources comprises:
    determining a particular PUCCH resource of the second group of PUCCH resources to be in the second set of PUCCH resources in response to a first symbol of the particular PUCCH resource being in the sub-slot of the slot.

* * * * *